United States Patent
Farooq et al.

(10) Patent No.: US 9,242,581 B2
(45) Date of Patent: Jan. 26, 2016

(54) AUTOMATIC PRESENTABLE SWIVELING SEAT

(71) Applicant: Ford Global Technologies, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/314,770

(22) Filed: Jun. 25, 2014

(65) Prior Publication Data

US 2015/0375638 A1     Dec. 31, 2015

(51) Int. Cl.
*B60N 2/04* (2006.01)
*B60N 2/06* (2006.01)
*B60N 2/14* (2006.01)
*B60N 2/16* (2006.01)
*B60N 2/24* (2006.01)

(52) U.S. Cl.
CPC .. *B60N 2/14* (2013.01); *B60N 2/06* (2013.01); *B60N 2/1635* (2013.01); *B60N 2/245* (2013.01)

(58) Field of Classification Search
CPC .......... B60N 2/07; B60N 2/14; B60N 2/2869; B60N 2/143; B60N 2/16; B60N 2/164; B60N 2/1665; B60N 2/067
USPC ......... 296/65.06, 65.07; 297/344.13, 344, 24; 248/157, 415, 416, 425, 429
See application file for complete search history.

(56) References Cited

U.S. PATENT DOCUMENTS

| | | | | |
|---|---|---|---|---|
| 872,247 | A | * | 11/1907 | Moss ..................... 296/65.13 |
| 2,992,852 | A | | 7/1961 | Loofbourrow et al. |
| 3,338,622 | A | | 8/1967 | Bachmann |
| 3,717,321 | A | * | 2/1973 | Vander Burgh ........ B60N 2/143 248/404 |
| 4,155,587 | A | * | 5/1979 | Mitchell ................ B60N 2/245 296/65.12 |
| 4,792,188 | A | | 12/1988 | Kawashima |
| 4,969,685 | A | | 11/1990 | Chihaya et al. |
| 5,524,952 | A | | 6/1996 | Czech et al. |
| 5,720,462 | A | | 2/1998 | Brodersen |
| 5,735,509 | A | * | 4/1998 | Gryp ...................... B60N 2/501 248/550 |
| 6,168,234 | B1 | | 1/2001 | Haynes et al. |
| 6,572,172 | B1 | | 6/2003 | Ninomiya et al. |
| 7,040,792 | B2 | | 5/2006 | Brandenburg et al. |

(Continued)

FOREIGN PATENT DOCUMENTS

| | | |
|---|---|---|
| EP | 0221544 B1 | 1/1992 |
| EP | 2161494 A1 | 3/2010 |
| EP | 2338732 A1 | 6/2011 |

OTHER PUBLICATIONS

"Linear-Rotary Motors"; LinMot; Jan. 21, 2011; pp. 1-16.

(Continued)

*Primary Examiner* — Dennis H Pedder
(74) *Attorney, Agent, or Firm* — Vichit Chea; Price Heneveld LLP (57) ABSTRACT

An automobile seat includes a cushion, a back coupled with the cushion, and a mounting unit. The mounting unit includes a mounting track and an actuator slidably coupled with the mounting track and coupled with the cushion. The actuator is extendable along an axis to move the cushion toward and away from the mounting track and is rotatable about the axis to rotate the cushion relative to the mounting track.

20 Claims, 6 Drawing Sheets

(56) References Cited

U.S. PATENT DOCUMENTS

| | | |
|---|---|---|
| 7,506,910 B2 | 3/2009 | Leitner et al. |
| 8,182,014 B2 * | 5/2012 | Mabuchi et al. ............ 296/64 |
| 8,528,975 B2 | 9/2013 | Maier et al. |
| 8,646,956 B2 | 2/2014 | Hering et al. |
| 2011/0168077 A1 * | 7/2011 | Bostrom et al. ............ 114/363 |
| 2013/0077337 A1 | 3/2013 | Rupar et al. |
| 2013/0127221 A1 | 5/2013 | Seibold et al. |
| 2014/0043843 A1 | 2/2014 | Moser et al. |
| 2014/0167472 A1 * | 6/2014 | Haller ............ B60N 2/508 |
| | | 297/344.22 |

OTHER PUBLICATIONS

"Rotary-Linear Actuator HSE4"; Eckart GmbH; Gewerbegebiet Wallroth; Oct. 2005; pp. 1-12.

"Hub Swivel Unit HSE4" Eckhart GmbH; Schluechtern, Germany; 2013; 1 page.

* cited by examiner

AUTOMATIC PRESENTABLE SWIVELING SEAT

FIELD OF THE INVENTION

The present invention generally relates to a rotating vehicle seat capable of easing ingress to and egress from a vehicle. In particular, the rotating seat is independently raised and rotated to provide increased range of rotation.

BACKGROUND OF THE INVENTION

Entering and exiting a motor vehicle, an automobile in particular, may be difficult for those with limited mobility. The forward-facing driving position of vehicle seats can be difficult to reach from the typical, laterally-disposed vehicle door. Further, the height of such seats, particularly in cars, may require additional lowering of one's body in combination with proper orientation thereof with respect to the seat. The rocker of a vehicle, which bounds the lower edge of the door opening and is often of a lateral thickness that separates the seat from the outside edge of the door opening, may present additional difficulty for vehicle ingress and egress. In particular, the configuration of a particular rocker may require one into a seating position that is uncomfortably rearward of the individual's feet and may also require one to lift his or her legs thereover while swinging them into the forward-facing seating position.

Various seats have been developed in an attempt to aid those with limited mobility in entering and exiting the associated automobile. However, none have provided a mechanism that overcomes both the restriction in geometry presented by the presence of the rocker, nor have they provided a seat that is capable of helping the occupant navigate the rocker. Accordingly, further advances are desired.

SUMMARY OF THE INVENTION

According to one aspect of the present invention, an automobile seat includes a cushion, a back coupled with the cushion, and a mounting unit. The mounting unit includes a mounting track and an actuator slidably coupled with the mounting track and coupled with the cushion. The actuator is extendable along an axis to move the cushion toward and away from the mounting track and is rotatable about the axis to rotate the cushion relative to the mounting track.

According to another aspect of the present invention, an automobile includes a floor, a seat, and a seat mount coupled between the floor and the seat. The mount includes an actuator that is extendable to move the seat vertically between a driving height and an access height that is higher than the driving height. The actuator is further rotatable to turn the seat between a forward-facing position that corresponds with the driving height and a side-facing position that corresponds to the access height.

According to another aspect of the present invention, a system for positioning a seat with respect to a vehicle door includes an actuator coupled between the seat and a floor of the vehicle. The system further includes a controller coupled with the actuator and operable to cause the actuator to extend to move the seat vertically between a driving height and an access height that is higher than the driving height. The controller is further operable to cause the actuator to rotate to turn the seat between a forward-facing position and a side-facing position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
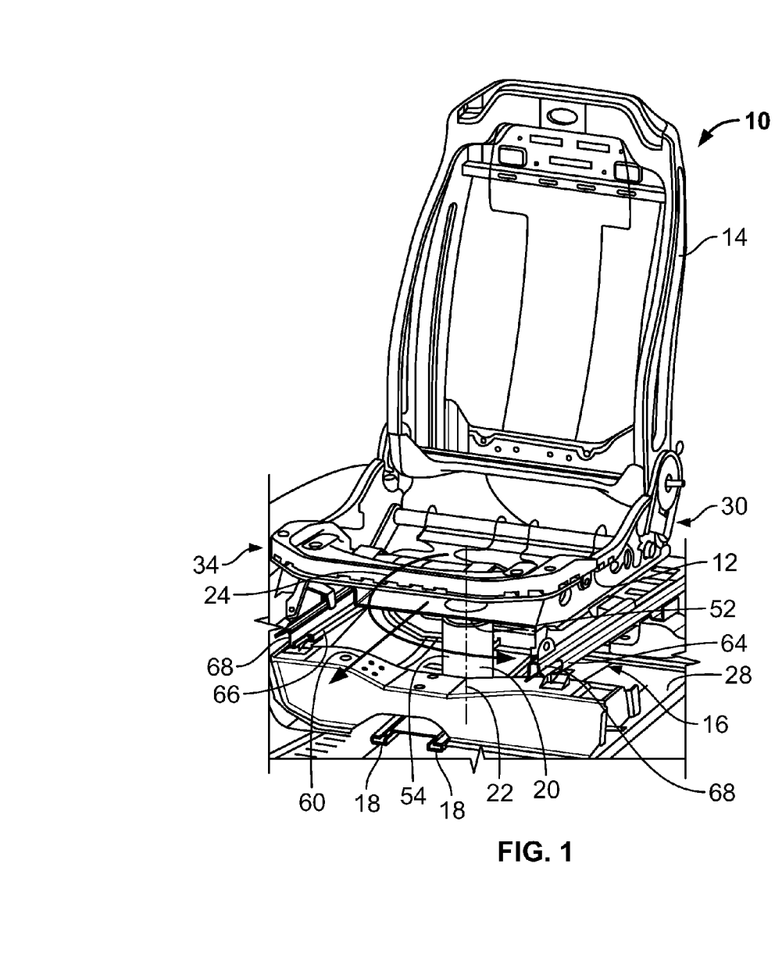
FIG. 1 is an elevation view showing portions of an automobile and associated rotating seat structure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-7, reference numeral 10 generally designates an automobile seat. Automobile seat 10 includes a cushion 12 and a back 14 coupled with cushion 12. Although internal components of seat 10 are shown, it is understood that a finished seat 10 would include padding and upholstery thereon. Seat 10 further includes a mounting unit 16 having a mounting track 18 and an actuator 20 slidably coupled with the mounting track 18 and coupled with cushion 12. Actuator 20 is extendable along an axis 22 so as to move cushion 12 toward and away from the mounting track 18. Actuator 20 is further rotatable about axis 22 so as to rotate cushion 12 relative to the mounting track 18.

Figure 5:
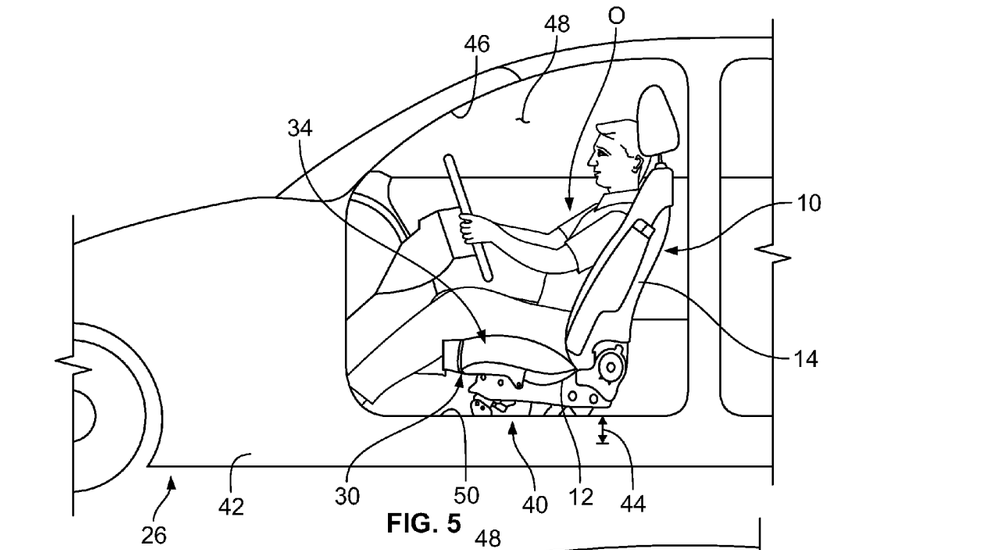
FIG. 5 is a side view of a portion of an automobile with a seat structure of FIG. 1 occupied by an occupant.
Figure 6:
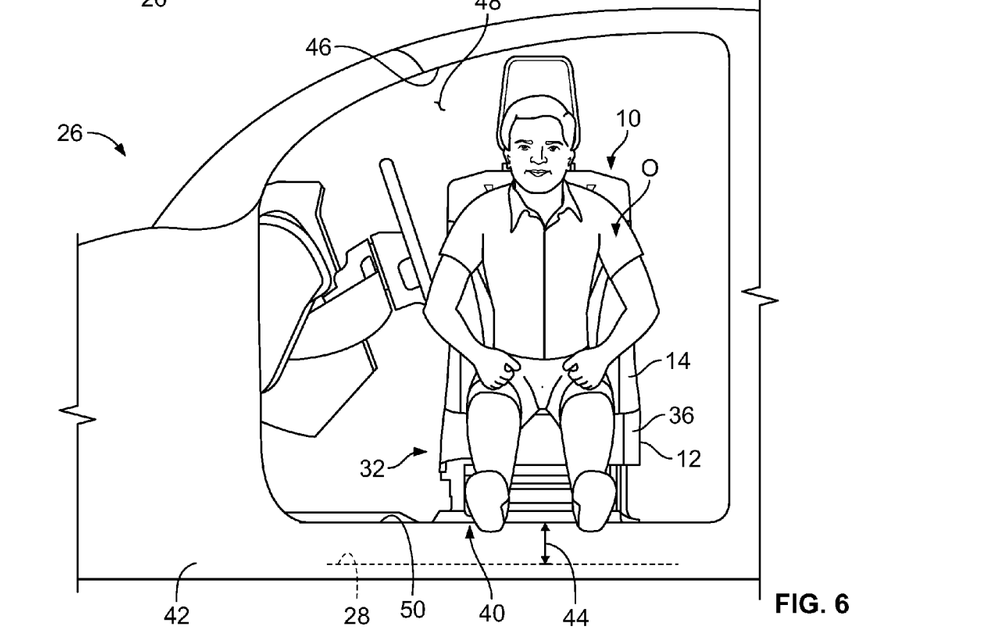
FIG. 6 is a side view of the automobile portion and seat structure of FIG. 5 in an access position, occupied by an occupant.
Figure 7:
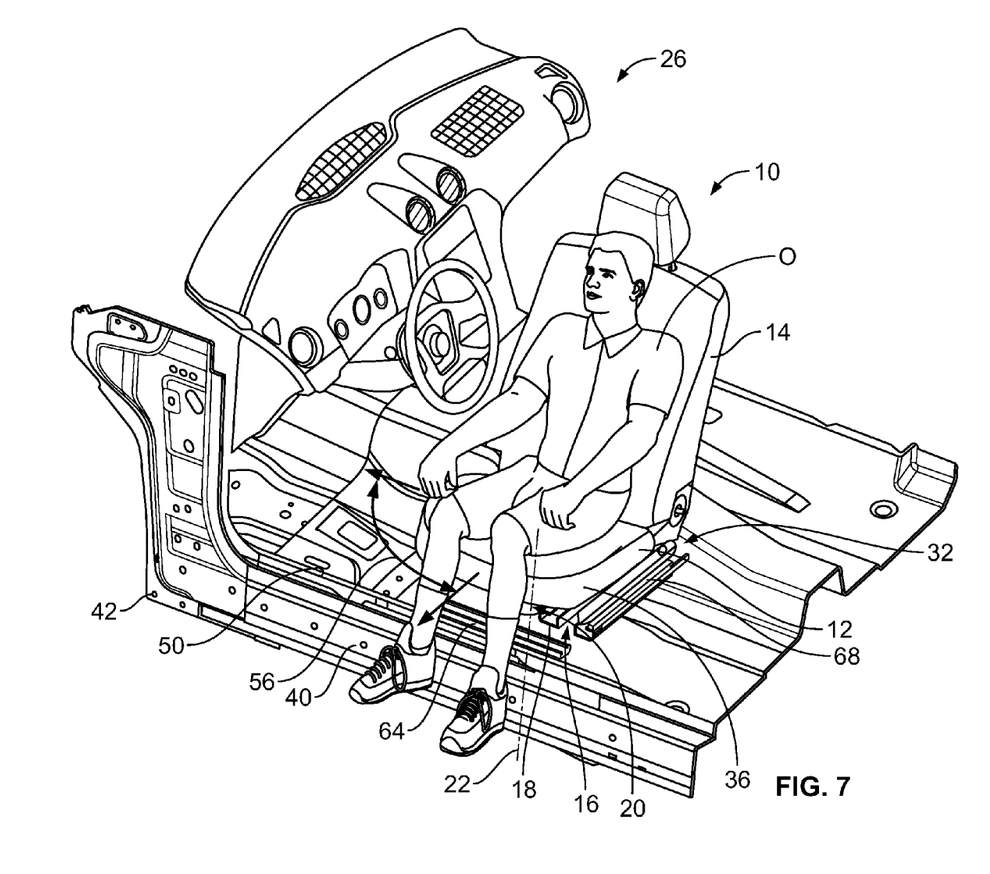
FIG. 7 is an elevational view of the automobile portion and seat structure of FIG. 6, occupied by an occupant.

As shown in FIGS. 5-7, seat 10 can be included in automobile 26 such that mounting unit 16 mounts seat 10 to the floor 28 of automobile 26. Mounting unit 16 may be coupled with floor 28 by means of mechanical fasteners, adhesives, welding, or the like, and may further be coupled to additional features of automobile 26 (including various cross-members, other frame elements, or the like). Specifically, mounting unit 16 can be coupled with floor 28 by attachment of mounting track 18 thereto. Further, actuator 20 can be slidable with respect to mounting track 18 to provide for fore-and-aft adjustment of seat 10, as described further below. As shown in FIGS. 5 and 6, the extension of actuator 20 can be effective to lift seat 10 by an upward force exerted on cushion 12 so as to move seat 10 from a driving height 30 (FIG. 5) to an access height 32 (FIG. 6). Additionally, rotation of actuator 20 about axis 22 is effective to rotate seat 10 about axis 22 between a forward-facing position 34 (FIG. 5) and a side-facing position 36 (FIG. 6). Both such raising and rotating of seat 10 by actuator 20 can present seat to door 46, thereby making ingress to and egress from automobile 26 easier for an occupant O of automobile 26.

As further shown in FIGS. 5-7, seat 10 may be positioned in the location of a driver's seat and occupant O may be a driver of automobile 26. In other examples, seat 10 may be positioned in the location of a front passenger seat, or can be a rear or middle captain's seat to be occupied by a passenger of the automobile 26. In particular, by rotating seat 10 by rotation of actuator 20 about axis 22, occupant O may enter or exit automobile 26 simply by sitting down or standing up on the seat 10, without the need to turn his or her body into position within seat 10. Similarly the raising of seat 10 by extension of actuator 20 along axis 22 can allow for easier entering or exiting of automobile 26, particularly in examples where automobile 26 has a low ground-clearance or a relatively low seating position, by reducing the amount by which occupant O must lower his or her body, or raise his or her body to respectively sit down into or stand up from seat 10.

Further, such raising of seat 10 by actuator 20 can allow for seat 10 to extend outwardly over rocker 40, which may be a portion of the vehicle body 42 and bound a portion of door opening 48 along edge 50 thereof. In some examples of automobile 26, the positioning of rocker 40 may be such that seat 10 may not have sufficient room to rotate when seat 10 is at driving height 30, as shown in FIG. 5. Accordingly, by raising seat 10, proper clearance for rotation thereof into side-facing position 36 (shown in FIGS. 6 and 7) may be accomplished. Further, actuator 20 can be coupled with cushion 12 at a location such that, after the raising of seat 10 to access height 32, when actuator 20 rotates seat 10 into side-facing position 36, a portion of cushion 12 can extend laterally over rocker 40 such that a portion thereof extends into or partially through door opening 48. Such positioning can further enhance the ease of ingress to and egress from automobile 26 by occupant O.

The driving height 30 of seat 10 can correspond to the forward-facing position 34 of seat 10, as shown in FIG. 5, to achieve a driving position for seat 10. It is noted that the terms "driving position," as well as "driving height," are used to generally refer to the depiction of seat 10 in the Figures, which when shown in connection with automobile 26 corresponds with the driver's seat of automobile 26. It is further noted that the term may similarly apply to seats 10 and other locations throughout automobile 26 coupled with a similar mounting unit 16. Further, access height 32 of seat 10 can correspond with side-facing position 36 of seat 10 to provide an access position, as shown in FIGS. 6 and 7.

Figure 8:
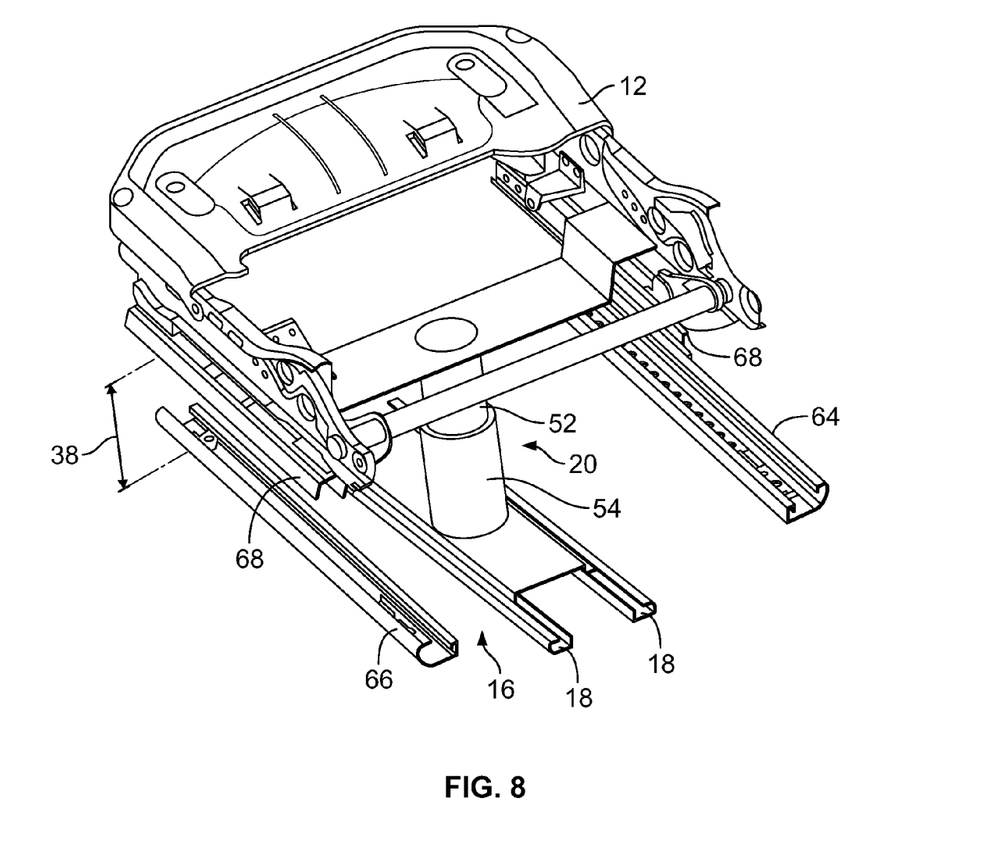
FIG. 8 is an elevational view of portions of the seat and related mounting assembly of the seat of FIG. 1.

Referring to FIGS. 6-8, to achieve the above-described movement of seat 10, actuator 20 can include a cylinder 54 that is coupled with mounting track 18 and piston 52 that is extendable and rotatable with respect to cylinder 54. It is noted that rocker height 44 can vary with different vehicles and vehicle types, and actuator 20 can be configured to extend by an extension range 38 that is at least equal to the rocker height 44 of the particular automobile 26. In some instances various actuators 20 can be specifically configured for the type or model of automobile 26 for which they are intended to be used, while in other examples the particular extension range 38 can be adjusted or limited, as needed, by an electromechanical controller for actuator 20, which is discussed in further detail below. In an embodiment, actuator 20 can be configured to have an extension range 38 of piston 52 relative to cylinder 54 of at least about 80 mm, and in some embodiments of between 8 cm and 20 cm, or in a more particular embodiment between about 10 cm and 15 cm.

Similarly, actuator 20 can be configured such that piston 52 is rotatable with respect to cylinder 54, about axis 22, through a rotation range 56 of at least about 45 degrees. In one embodiment rotation range 56 can be between about 60 and 90 degrees and in one embodiment about 90 degrees. Various examples of actuator 20 can be configured such that piston 52 is rotatable with respect to cylinder 54 through at least about one-half of a full revolution, a full revolution, or several, sometimes limitless, revolutions. However, for application in connection with seat 10, as described herein, a particular actuator 20 used can be adapted such that the motion of piston 52 with respect to cylinder 54 is limited to the particular rotation range 56 desired for movement of seat 10, as described above. In particular, such rotation of piston 52 can be limited by mechanical modifications to actuator 20 and/or programmed limits within a computerized control system, as discussed further below.

Figure 3:
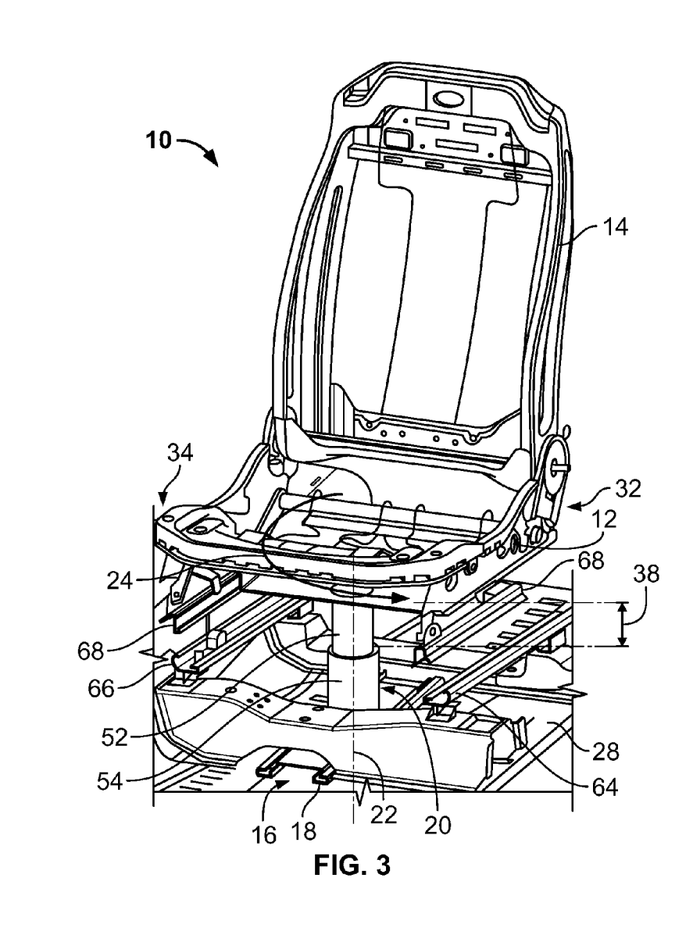
FIG. 3 is an elevation view of the automobile portions and associated seat structure in a raised position.
Figure 4:
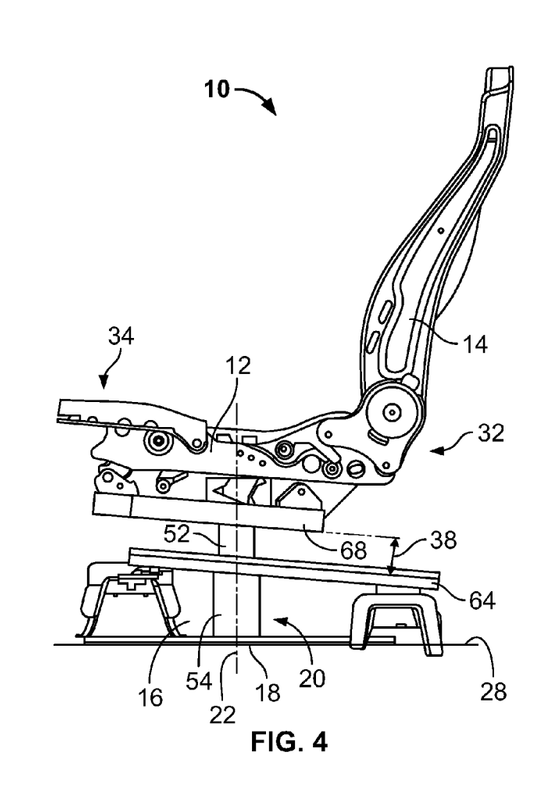
FIG. 4 is a side view of the automobile portion and seat structure of FIG. 3.

Further, actuator 20 and/or an associated control system can be capable of independently extending piston 52 from cylinder 54 and rotating piston 52 with respect to cylinder 54. Such independent movement can allow for actuator 20 to separately or sequentially raise seat 10 from driving height 30 to access height 32 (as shown in FIGS. 3 and 4) and to rotate seat from forward-facing position 34 to side-facing position 36. For example, actuator 20 can first begin to lift seat 10 toward access height 32 from driving height 30 without rotation of seat 10 such that a height of seat 10 can be achieved such that rotation of seat 10 is no longer blocked by rocker 40, or other portions of automobile 26, at which point seat 10 can be rotated by actuator 20, with or without continued raising of seat 10. Similarly, seat 10 can be moved by actuator 20 from the side-facing position 36 toward the forward-facing position 34 without lowering of seat 10 from access height 32 to driving height 30 during a rotational motion range 56 wherein downward movement of seat 10 is obstructed by a portion of rocker 40 underlying a portion of seat 10, as discussed above. Accordingly, lowering of seat 10 can be delayed until such a point where cushion 12 is clear of rocker 40, at which point seat 10 may be lowered to the driving height 30.

Other variations of such sequential movement are possible, including those involving multiple steps of independent and/or simultaneous raising or lowering of seat 10 and rotation of seat 10. Mounting unit 16 can further be configured such that seat 10 is adjustable in the fore/aft direction (i.e. in longitudinal direction 60) according to at least one of the adjustment modes typically found in connection with an automobile seat, such as seat 10. Such movement can be facilitated by the slidable mounting of actuator 20 on mounting track 18 which can be driven by a separate motor (not shown) coupled between mounting track 18 and actuator 20 and connected with a control or control system that can cause such a motor to move actuator 20 along longitudinal direction 60, as desired, for example, by occupant O.

Figure 2:
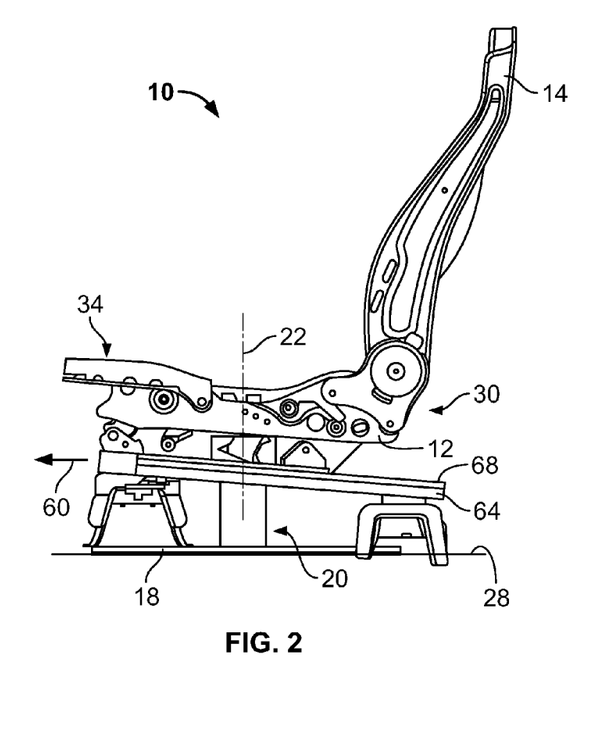
FIG. 2 is a side view of the rotating seat structure of FIG. 1.

As shown in FIG. 8, mounting unit 16 can include a pair of mounting tracks 18 spaced laterally apart at a distance along floor 28 of automobile 26. Support tracks 64 and 66 can provide for additional support for cushion 12, which can releasably couple therewith by means of slides 68, which are disposed toward the lateral edges of cushion 12, outward of mounting tracks 18. As shown in FIG. 2, when seat 10 is in the forward-facing position 34 and at driving height 30, as controlled by actuator 20, slide 68 may respectively rest on first support track 64 and second support track 66, which accordingly, bear at least a portion of the width seat 10 thereon. Slides 68 and support tracks 64 and 66 are configured such that slides can slide fore and aft along tracks 64 and 66 during fore and aft movement of seat 10, as driven by the above-mentioned movement of actuator 20 along mounting tracks 18. When in such a position, slide 68 may couple with first and second support track 64 and 66 by the weight of seat 10 on support tracks 64 and 66, and inter-engaging cross section thereof may serve to maintain alignment of slides 68 on first and second support tracks 64 and 66, respectively. In another example, an additional locking feature may be present and joined with either one of slides 68 or with first and second support tracks 64 and 66 that can serve to lock the coupling of slides 68 on to the respective ones of first and second support tracks 64 and 66 when seat 10 is in the position shown in FIG. 2.

Any coupling between slides 68 and corresponding support tracks 64 and 66 can be released when seat 10 is raised towards access height 32 to allow slides 68 to rotate with respect to support tracks 64 and 66, thereby allowing seat 10 to rotate by the above-described movement of actuator 20. Such decoupling can be automatic, such as in the weight-bearing coupling arrangement, by lifting of seat 10 by actuator 20, which separates slides 68 from support tracks 64 and 66, which are in a fixed position relative to mounting tracks 18. Alternatively, mechanical decoupling between slides 68 and one or more of first and second support tracks 64 and 66 can be actuated by a lever, or by an electromechanically controlled release upon manual or automatic entering into an access mode by automobile 26. Support tracks 64 and 66 can, accordingly, be configured to provide additional rigidity and support for seat 10, as need, to withstand the dynamic forces applied to seat during driving of automobile 26. Such supplemental support can allow for mounting track 18 to provide, for example, only the support that is necessary to lift seat 10 and an occupant thereof while automobile 26 is stationary. This can improve the ability to package mounting unit 16 within an available space between seat cushion 12 and floor 28, as well as the available range of motion for actuator 20.

Figure 9:
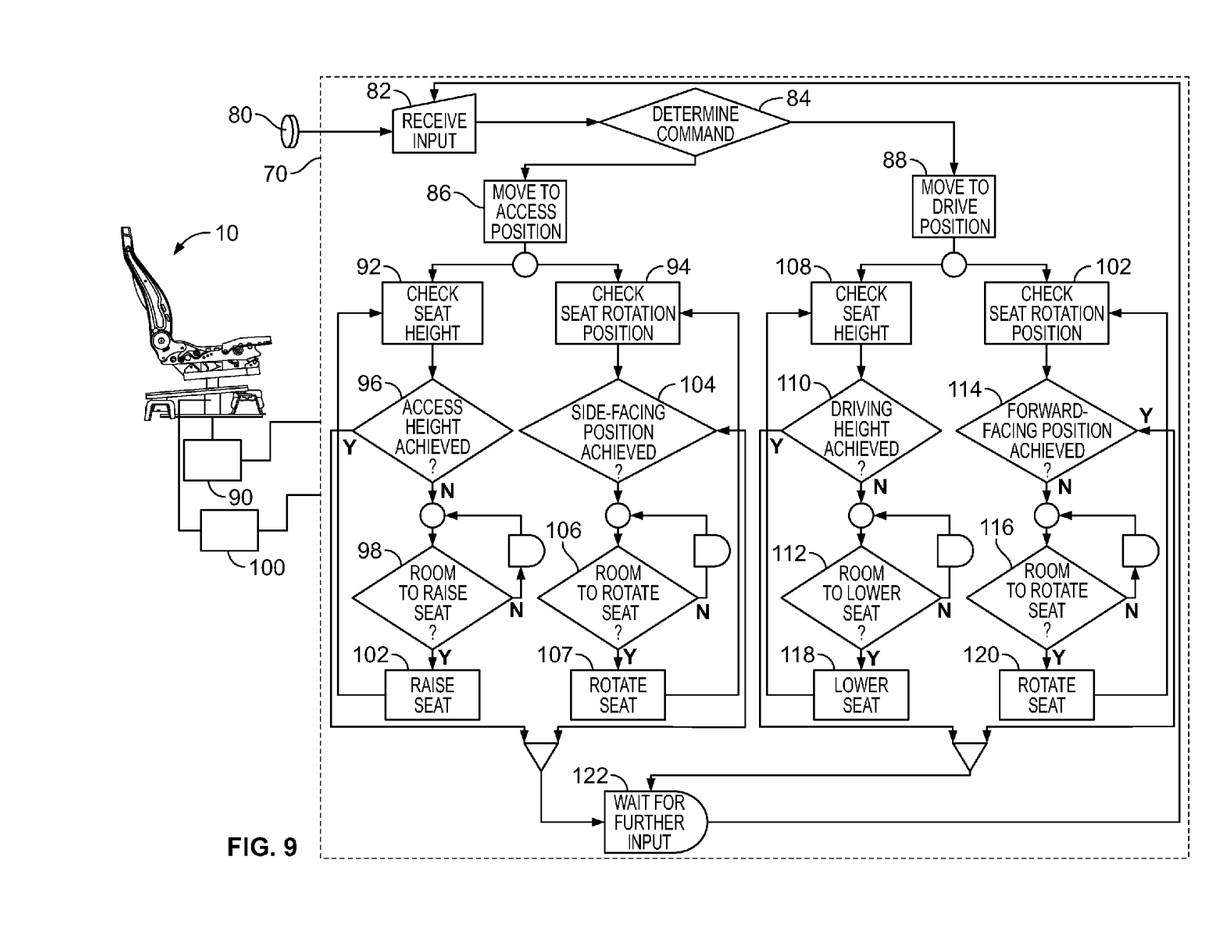
FIG. 9 is a diagram showing a system for controlling movement of a vehicle seat such as that shown in FIG. 1.

As shown in FIG. 9, automobile 26 can include a system 70 controlling the above-described movement of seat 10 by actuator 20. System 70 can include a command processor 100 within automobile 26, as well as a seat position sensor 90, and an input device 80, which as shown in FIG. 9 may be in the form of a button. Input device 80 can also be in the form of a command within another control device of automobile 26. For example, the input device 80 may be found within a menu of a screen-based control system found within automobile 26 and used to control various other functions thereof. System 70 can be configured to receive both a command to move the seat 10 to the access position, which includes moving seat 10 to driving height 30 and into side-facing position 36 (as shown in FIG. 6, for example), as well as a command to move seat 10 into the driving position, which includes positioning seat 10 at driving height 30 and in forward-facing position 34 (as shown in FIG. 5, for example). As shown in FIG. 9, system 70 can receive an input in step 82 from input device 80, and can interpret the input in step 84 to determine if a command was given to move to access position or to move to the drive position.

If, for example system 70 interprets the input received in step 82 to be a command to move to the access position, in step 86, system 70 can enter a "move to access position" sequence, which begins with system 70 simultaneously checking both the seat height and the seat rotation position in steps 92 and 94, respectively, to determine if the access height 32 has been achieved in step 96 and to determine if the side-facing position 36 has been achieved in step 104. Such steps 98 and 104 can be carried out to determine if rotational or vertical movement of seat 10 by actuator 20 is necessary to achieve the desired position, as interpreted by system 70 based on the input received in step 82. If either of such movements are needed, system 70 can then make an evaluation, including analysis of information received from position sensor 90 as well as stored data related to the surrounding portions of automobile 26, to determine, in step 98, if there is sufficient room to raise seat 10, and in step 104 if there is sufficient room to rotate seat 10.

In various examples the ability of system 70 to safely raise seat 10 can be affected by the position of the steering wheel within in automobile 26 with respect to either cushion 12 or the legs of the occupant of seat 10 with respect to the steering wheel, or other similar factors. Similarly, the ability to rotate seat 10 can be influenced by the position of cushion 12 with respect to the adjacent rocker 40 associated with vehicle body 42. Based on the evaluations in steps 98 and 104, system 70 can cause actuator 20 to, for example, raise seat 10, in step 102, while delaying rotation thereof until seat 10 reaches a height at which rotation is possible. Alternatively, system 70 can cause actuator 20 to rotate seat 10, in step 106, while delaying lifting thereof until a point is reached at which lifting is possible. Still further, system 70 can cause actuator 20 to both rotate and lift seat 10 simultaneously, so long as such movement is determined to be possible. Once an appropriate sequence of rotating and lifting of seat 10 by actuator 20 has been carried out to move seat 10 into both the access height 32 and the side-facing position 36, system 70 can stop such movement of seat 10 and can wait for further input in step 122.

In another example, where system 70 interprets the input received in step 82 to be a command to move seat 10 to the driving position, system 70 can execute a series of similar steps to achieve a reverse motion of seat 10 by actuator 20. As shown in FIG. 9, this can include using position sensor 90 to determine instantaneous seat height and rotation position in steps 108 and 102, respectively. System 70 can then check to see if lowering of seat is necessary in step 108 and if rotation of seat 10 is necessary in step 104. If either of such movements is necessary, system 70 can then evaluate if rotation of seat is possible toward forward-facing position 34 in step 106 and if room to lower seat 10 toward driving height 30 is available in step 112. System 70 can then execute whichever movements are needed and possible, lowering seat 10 in step 118 and rotating seat 10 toward forward-facing position 34 in step 114. System 70 can take a series of steps through such a progression involving combinations of simultaneous rotation and lowering, as well as rotation alone or lowering alone, as needed to appropriately position seat 10. When such positioning is achieved system 70 can return to waiting for further input in step 122. Other similar control systems can be used to achieve the desired movement of seat 10 using actuator 20, and can include for example, a variation in which the occupant of seat 10 or another occupant of automobile 26 uses a control pad to manually control vertical and/or rotational movement of seat 10.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. An automobile seat, comprising:
a cushion;
a back coupled with the cushion; and
a mounting unit, comprising:
 a mounting track;
 an actuator having a housing slidably coupled with the mounting track and a piston coupled with the cushion and automatically extendable from the housing along an axis to move the cushion toward and away from the mounting track and automatically rotatable about the axis to rotate the cushion relative to the mounting track.

2. The automobile seat of claim 1, wherein:
the mounting track is coupleable with a portion of an automobile adjacent a floor thereof so as to support the seat and mount the seat to an automobile;
the actuator is extendable through an extension range at least equal to a height of a rocker of the automobile above the mounting track thereof.

3. The automobile seat of claim 1, wherein the actuator is extendable through an extension range of at least 80 mm.

4. The automobile seat of claim 1, wherein the actuator is rotatable through a rotation range of between about 75 degrees and 90 degrees.

5. The automobile seat of claim 4, wherein the actuator is independently extendable and rotatable.

6. The automobile seat of claim 1, wherein:
the mounting track is one of a pair of mounting tracks spaced apart from one another at a first lateral distance;
the mounting unit further includes a pair of support tracks spaced apart from one another at a second lateral distance that is greater than the first lateral distance such that the support tracks are disposed laterally outward of the mounting tracks; and
the cushion is releasably coupleable with the support tracks.

7. The automobile seat of claim 6, wherein:
the support tracks are fixed relative to the mounting tracks; and
the coupling of the cushion with the support tracks decouples during a movement of the cushion away from the mounting tracks by the actuator.

8. The automobile seat of claim 7, wherein the decoupling of the coupling of the cushion with the support tracks allows the actuator to rotate the cushion.

9. The automobile seat of claim 6, wherein the actuator is slideable along the mounting tracks to move the actuator in a longitudinal direction along the mounting tracks such that the cushion further moves in the longitudinal direction along the supporting tracks.

10. An automobile, comprising:
a floor;
a seat; and
a seat mount coupled between the floor and the seat, the mount including an actuator with a housing mounted to the floor and a piston coupled with the seat, the piston:
 received within the housing;
 automatically extendable from the housing to move the seat vertically between a driving height and an access height that is higher than the driving height; and
 automatically rotatable to turn the seat between a forward-facing position that corresponds with the driving height and a side-facing position that corresponds to the access height.

11. The automobile of claim 10, wherein the seat mount further includes a mounting track extending longitudinally along the floor, the housing of the actuator being mounted to the floor by being slidably coupled with the mounting track such that the seat is moveable in a longitudinal direction with respect to the floor.

12. The automobile of claim 11, further including a pair of support tracks spaced laterally of the mounting track, the seat being releasably coupleable with the support tracks such that the seat is coupled with the support tracks when the seat is in the forward-facing position at the driving height and decoupled with the support tracks when the seat is at the access height.

13. The automobile of claim 10, further including a body within which the floor is included, the body further defining a door opening and a rocker extending at a rocker height between the floor and a lower edge of the door opening, wherein the access height of the seat is greater than the rocker height, and the driving height is less than the rocker height.

14. The automobile of claim 13, wherein the side-facing position of the seat is such that a portion of the seat extends laterally from the seat mount and over a portion of the rocker.

15. The automobile seat of claim 10, wherein:
   the access height is at least 80 mm above the driving height; and
   the side-facing position is at least 75 degrees from the forward-facing position.

16. A system for positioning a seat with respect to a vehicle door, comprising:
   an actuator including a piston coupled with the seat and a housing coupled with a floor of the vehicle, the piston received within the housing; and
   a controller coupled with the actuator and operable to cause the actuator to:
      extend the piston from the housing to move the seat vertically between a driving height and an access height that is higher than the driving height; and
      rotate the piston relative to the housing to turn the seat between a forward-facing position and a side-facing position.

17. The system of claim 16, further including an input device coupled with the controller to cause the controller to extend and rotate the actuator according to a user input.

18. The system of claim 17, wherein the user input includes one of:
   an access position command, whereby the controller moves the seat to the access height and rotates the seat to the side-facing position; and
   a driving position command, whereby the controller moves the seat to the driving height and rotates the seat to the forward-facing position.

19. The system of claim 16, wherein:
   the forward-facing position is such that the seat is aligned with a longitudinal axis of the vehicle; and
   the side-facing position is such that the seat is within about 75 degrees and 90 degrees of the longitudinal axis in a direction toward the vehicle door.

20. The system of claim 16, wherein:
   the access height is at least 80 mm above the driving height; and
   the side-facing position is at least 75 degrees from the forward-facing position.

\* \* \* \* \*